United States Patent [19]

Chiang

[11] Patent Number: 5,228,990
[45] Date of Patent: Jul. 20, 1993

[54] OIL FILTER

[76] Inventor: Jean Chiang, 6th Fl., No. 55, Sec. 2, Chunghsiao Rd., Sanchung City, Taipei County, Taiwan

[21] Appl. No.: 863,688

[22] Filed: Apr. 1, 1992

[51] Int. Cl.⁵ .............................................. B01D 35/06
[52] U.S. Cl. ..................................... 210/223; 210/440
[58] Field of Search ............... 210/222, 223, 315, 316, 210/342, 440; 55/100; 184/6.25

[56] References Cited

U.S. PATENT DOCUMENTS

| | | | |
|---|---|---|---|
| 4,705,626 | 11/1987 | Morelli | 210/223 |
| 5,009,779 | 4/1991 | Hebert | 210/223 |
| 5,078,877 | 1/1992 | Cudaback et al. | 210/315 |

Primary Examiner—Matthew O. Savage
Attorney, Agent, or Firm—Watson, Cole, Grindle & Watson

[57] ABSTRACT

An oil filter includes a housing, a first cylindrical metallic sieve received in the housing, a filter medium disposed between the first cylindrical metallic sieve and the housing, and an end cap. The end cap has a central outlet through which filtered oil exits and a plurality of peripheral inlets through which oil to be filtered enters. A spaced is defined by the first cylindrical metallic sieve, in which a support is securely mounted to a lower portion thereof adjacent to the central outlet. A filter element is securely retained in the space by the support for removing ferric particulate contained in oil to be filtered. The oil filter includes a second cylindrical metallic sieve held by two caps, a plurality of magnets, and a plurality of third metallic sieves being alternatively disposed around the second cylindrical metallic sieve and being held between the two caps.

1 Claim, 3 Drawing Sheets

OIL FILTER

BACKGROUND OF THE INVENTION

The present invention relates to an improved oil filter, and more particularly to an improved oil filter capable of removing micron metallic particles, especially micron ferric particles which cannot be removed by conventional oil filters.

Oil filters are necessary in motor vehicles and motorcycles for cleaning motor oil used for cooling and lubricating elements of the engines thereof. In doing this, oil filters may carry away metallic particles, especially ferric particles, resulting from frictional contact between elements. However, conventional oil filters are not capable of removing micron particles having an average width smaller than 10 microns. The unfiltered micron ferric particles circulate in the engine, scraping and causing damage to inner walls of the cylinders, as well as damaging other elements.

The present invention provides an improved oil filter which mitigates and/or obviates the above-mentioned problems.

SUMMARY OF THE INVENTION

An oil filter generally includes a housing, a first cylindrical metallic sieve received in the housing, a filter medium disposed between the first cylindrical metallic sieve and the housing, and an end cap. The end cap has a central outlet through which filtered oil exits and a plurality of peripheral inlets through which oil to be filtered enters.

According to the present invention, in a space defined by the first cylindrical metallic sieve a support is securely mounted to a lower portion thereof adjacent to the central outlet. A filter element is securely retained in the space by the support.

The filter element includes a second cylindrical metallic sieve held by an upper cap and a lower cap. The lower cap has an opening in fluid communication with the central outlet of the oil filter, through which the filtered oil passes. A plurality of magnets and a plurality of third metallic sieves are alternatively disposed around the second cylindrical metallic sieve and are held between the upper and lower caps. Each magnet is provided with a washer on both sides thereof.

The entire filter element is held in the space encompassed by the first cylindrical metallic sieve by the support. Oil to be filtered enters the oil filter via the peripheral inlets. Thereafter, oil passes through the filter medium, the first cylindrical metallic sieve, and then exits out of the oil filter via the opening of the lower cap. Ferric particulate contained in the oil are removed by the magnets.

Accordingly, it is a primary object of the present invention to provide an improved oil filter for removing ferric particulate in oil.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
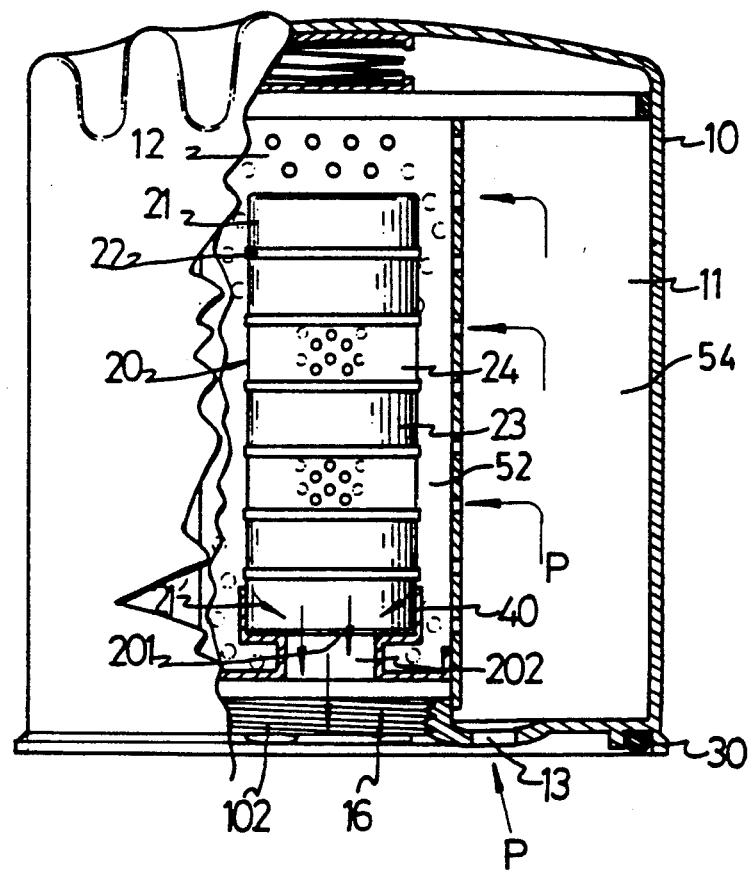
FIG. 1 is a cutaway, partially cross-sectional view of an improved oil filter according to the present invention.
Figure 2:
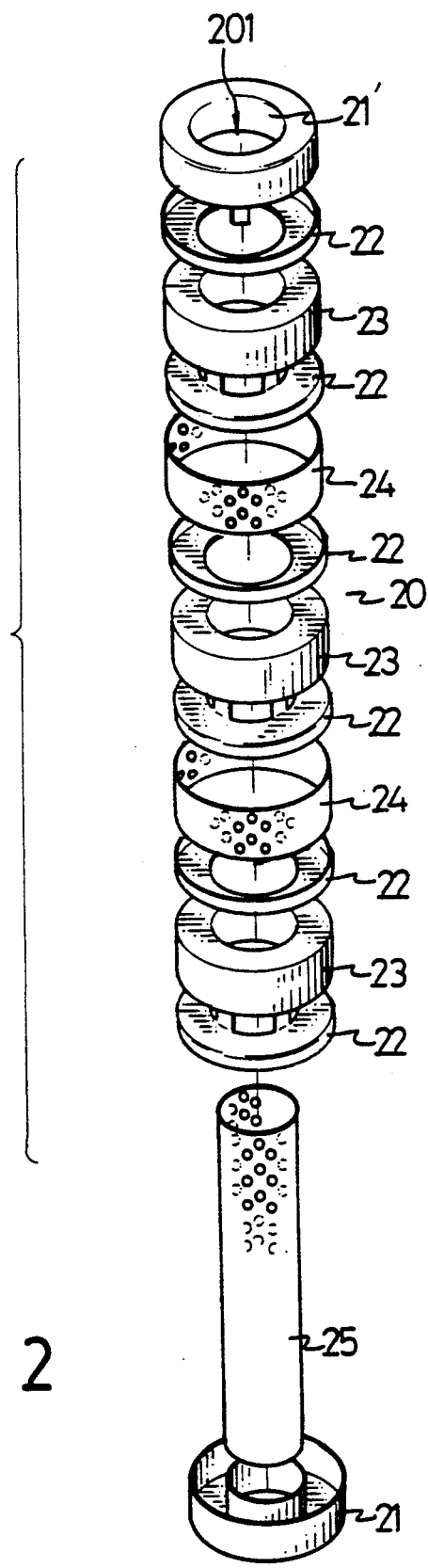
FIG. 2 is an exploded upside-down perspective view of a filter element of the oil filter according to the present invention.
Figure 3:
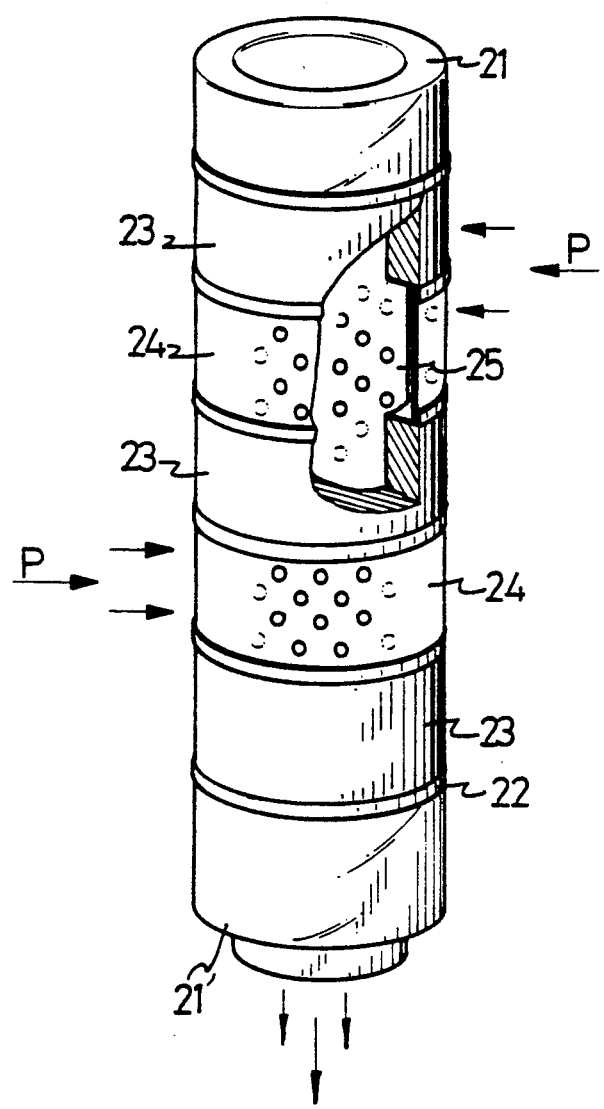
FIG. 3 is a perspective view of the filter element of FIG. 2.

Referring to FIGS. 1 through 3, an oil filter generally includes a housing 10, a first cylindrical metallic sieve 12 received in the housing, a filter medium 11 disposed in an outer chamber 5 defined by the cylindrical metallic sieve 12 and the housing 10, and an end cap 16. The end cap 16 removably and sealingly mounted to a lower opening (not labeled) of the housing 10 has a central outlet 102 through which filtered oil exits and a plurality of peripheral inlets 13 through which oil to be filtered enters. An annular rubber band 30 is provided around the end cap 16 for sealing.

In an inner chamber 52 defined by the first cylindrical metallic sieve 12, a support 40 is securely mounted to a lower portion thereof adjacent to the central outlet 102. A filter element 20 is securely retained in the space by the support 40, as shown in FIG. 1. The support 40 is constructed so that the oil passes through the filter element 20 before exiting the outlet 102 of the end cap 16.

Referring to FIGS. 2 and 3, the filter element 20 includes a second cylindrical metallic sieve 25 held by an upper cap 21 and a lower cap 21'. In this embodiment, the lower cap has an opening 201, and the support 40 defines a passage 202 through which filtered oil exits to the central outlet port 102 of the end cap 16. A plurality of cylindrical magnets 23 and a plurality of cylindrical third metallic sieves 24 are coaxially disposed about and alternately disposed along the second cylindrical metallic sieve 25 and are held between the upper and lower caps 21 and 21'. Each magnet 23 is provided with a washer 22 on both sides thereof.

Referring now to FIGS. 1 and 3, the entire filter element 20 is held in the inner chamber 52 compassed by the first cylindrical metallic sieve 12 by the support 40. Oil to be filtered enters the oil filter via the peripheral inlets 13. Thereafter, oil passes through the filter medium 11, the first cylindrical metallic sieve 12, and then exits the outlet 102 of the oil filter via the opening 201 defined by the support 40, as indicated by arrows P.

It is noted that the oil only can exit via the passage 202 defined by of the support 40, i.e., the oil is filtered by the filter element 20 before exiting the oil filter. Micron ferric particles contained in the oil are attracted by the magnets 23 and are thus removed from the oil. Replacement of the filter element can be done at the time the oil filter is normally replaced, which is quite convenient.

According to the above, it is noted that the micron ferric particles contained in the oil are removed. Abrasion and frictional resistance in the engine caused by the ferric particles are eliminated. Frictional heat is reduced while prolonging the life of the engine, improving heat efficiency, saving fuel, and reducing the amount of toxic exhaust gas.

Although the invention has been explained in relation to its preferred embodiment, it is to be understood that many other possible modifications and variations can be made without departing the spirit and scope of the invention as hereinafter claimed.

I claim:

1. An oil filter comprising:
   a housing which defines a first opening;
   an end cap sealingly mounted to said first opening, said end cap defining an outlet port centrally located therein and a plurality of inlet ports spaced from and surrounding said outlet port;
   a first cylindrical metallic sieve mounted in said housing so as to define an inner chamber therewithin and an outer chamber between said first cylindrical metallic sieve and said housing, said outlet port of said end cap communicating with said inner chamber and said plurality of inlet ports of said end cap communicating with said outer chamber;
   a filter medium disposed in said outer chamber;
   a support mounted in said inner chamber at an end portion of said first cylindrical metallic sieve and defining a passage which communicates with said outlet port;
   and a filter element securely retained in said inner chamber by said support, said filter element comprising a first cap, a second cap mounted on said support and defining a second opening which communicates with said passage of said support, a second cylindrical metallic sieve held between said first and second caps, and a plurality of cylindrical magnets and cylindrical third metallic sieves coaxially disposed about and alternately disposed along said second cylindrical metallic sieve and held between said first and second caps;
   whereby oil to be filtered enters said outer chamber via said inlet ports, passes through said filter medium and said first cylindrical metallic sieve into said inner chamber, and then exits said outlet of said end cap via said second cylindrical metallic sieve and said third metallic sieves, said second opening of said second cap and said passage of said support such that micron ferric particles contained in the oil are retained by said magnets and filtered from said oil.

* * * * *